(12) United States Patent
Weston (10) Patent No.: US 9,541,112 B1
(45) Date of Patent: Jan. 10, 2017

(54) INVISIBLE PICTURE HANGING DOT

(71) Applicant: Mark William Weston, Bradenton, FL (US)

(72) Inventor: Mark William Weston, Bradenton, FL (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 14/688,662

(22) Filed: Apr. 16, 2015

Related U.S. Application Data (60) Provisional application No. 62/010,263, filed on Jun. 10, 2014.

(51) Int. Cl.
  *F16B 13/04* (2006.01)
  *F16B 13/08* (2006.01)
  *A47G 1/16* (2006.01)

(52) U.S. Cl.
  CPC ......... *F16B 13/0833* (2013.01); *A47G 1/1633* (2013.01)

(58) Field of Classification Search
  CPC ....... F16B 13/0808; F16B 13/04; F16B 13/00; F16B 13/06
  USPC ............. 411/38, 37, 15, 340, 341, 342, 344; 248/231.91, 231.9, 493
  See application file for complete search history.

(56) References Cited

U.S. PATENT DOCUMENTS

| | | | | |
|---|---|---|---|---|
| 1,295,734 A | * | 2/1919 | Greubel | F16B 13/0808 411/38 |
| 1,623,789 A | * | 4/1927 | Hubener | F16B 13/0808 220/234 |
| 2,559,281 A | * | 7/1951 | Croessant | F16B 13/061 411/38 |
| 3,143,916 A | * | 8/1964 | Rice | F16B 13/061 411/37 |
| 3,211,042 A | * | 10/1965 | Fischer | F16B 13/0808 411/344 |
| 3,213,746 A | * | 10/1965 | Dwyer | F16B 13/06 411/15 |
| 3,288,014 A | * | 11/1966 | Mortensen | F16B 13/0808 411/344 |
| 3,332,118 A | * | 7/1967 | Temple | A62B 35/04 24/114.5 |
| 3,651,734 A | * | 3/1972 | McSherry | F16B 5/0642 411/15 |
| 3,983,904 A | * | 10/1976 | Laviano | F16L 55/136 138/89 |

(Continued)

OTHER PUBLICATIONS https://www.google.com/search?q=butterfly+anchor+ceiling+mount&hl=en&tbm=isch&source=lnms&sa=X&ei=masXUtvBK8fh2wWmroHQBQ&ved=0CAcQ_AUoAQ&biw=1422, accessed on May 8, 2015.

(Continued)

*Primary Examiner* — Kimberly Wood
(74) *Attorney, Agent, or Firm* — Nicholas Pfeifer; Smith & Hopen, P.A.

(57) ABSTRACT

The present invention is an art hanging system that uses a drywall anchor combined with monofilament to create a nearly invisible ceiling hangar. The monofilament is fed through the low profile drywall anchor, and tied to an anchor such that when force is applied to the monofilament, the anchor flattens and grabs the ceiling or wall panel. The plastic interior face of the anchor is low profile and transparent such that it presents limited visual distraction to the ceiling plane.

16 Claims, 5 Drawing Sheets

(56) References Cited

U.S. PATENT DOCUMENTS

| | | | | |
|---|---|---|---|---|
| 4,075,924 A * | 2/1978 | McSherry | ............ | F16B 13/0808 411/112 |
| 4,079,655 A * | 3/1978 | Roberson, Jr. | ...... | F16B 13/0808 411/344 |
| 4,152,968 A * | 5/1979 | Lassine | ................ | F16B 13/061 411/38 |
| 4,181,061 A * | 1/1980 | McSherry | ........... | F16B 13/0808 411/55 |
| 4,197,781 A * | 4/1980 | Giannuzzi | ............ | F16B 13/061 411/34 |
| 4,274,324 A * | 6/1981 | Giannuzzi | ............ | F16B 13/061 411/15 |
| 4,286,497 A * | 9/1981 | Shamah | .................. | F16B 37/04 411/342 |
| 4,289,062 A * | 9/1981 | Schiefer | ................ | F16B 13/061 411/15 |
| 4,294,156 A * | 10/1981 | McSherry | ........... | F16B 13/0808 411/344 |
| 4,397,595 A * | 8/1983 | Smith | .................. | F16B 13/061 411/15 |
| 4,415,299 A * | 11/1983 | Smith | .................. | F16B 13/061 411/15 |
| 4,439,079 A * | 3/1984 | Losada | ............... | F16B 13/0808 24/16 PB |
| 4,573,844 A * | 3/1986 | Smith | ................. | F16B 13/0808 24/453 |
| 4,704,057 A * | 11/1987 | McSherry | ........... | F16B 13/0808 411/344 |
| 4,943,253 A * | 7/1990 | Smith | .................... | B25B 31/00 29/271 |
| 4,971,502 A * | 11/1990 | Oh | .......................... | F16B 35/00 411/340 |
| 4,993,901 A * | 2/1991 | McSherry | ........... | F16B 13/0808 411/340 |
| 5,244,324 A * | 9/1993 | Smith | ................. | F16B 13/0808 411/340 |
| 5,369,856 A * | 12/1994 | Hauser | ............... | A44B 17/0023 24/110 |
| 5,472,304 A * | 12/1995 | Gold | ....................... | F16B 37/04 411/344 |
| 5,716,179 A * | 2/1998 | Smith | ................. | F16B 13/0808 411/340 |
| 6,213,701 B1 * | 4/2001 | Ukai | ................... | F16B 13/0833 411/340 |
| 8,840,644 B2 * | 9/2014 | Napolitano | ........ | A61B 17/0401 606/139 |
| 2004/0065795 A1 | 4/2004 | Levy | | |

OTHER PUBLICATIONS http://www.quebecacoustic.com/Primacoustic_Nimbus_Ceiling_Cloud_Acoustic_Panels_1234.html, accessed on May 8, 2015.

http://www.systematicart.com/TBSKRC304-sku/124/Tension-Cable-Set---(Fixed)---Ceiling-to-Floor-Kit.html, accessed on May 8, 2015.

http://www.systematicart.com/ECP-4749-sku/85/Ceiling-Mounted-Coupler-Set.html, accessed on May 8, 2015.

* cited by examiner

INVISIBLE PICTURE HANGING DOT

CROSS-REFERENCE TO RELATED APPLICATIONS

This nonprovisional application is a continuation of and claims priority to provisional application No. 62/010,263, entitled "INVISIBLE PICTURE HANGING DOT," filed Jun. 10, 2014 by the same inventor.

BACKGROUND OF THE INVENTION

1. Field of the Invention

This invention relates, generally, to an anchoring or fastening device. More specifically, it relates to anchor utilizing a monofilament to create a nearly invisible hanging system.

2. Brief Description of the Prior Art

Current models of picture hanging systems use rails or channels to anchor wires for hanging art. These rails have a strong visual profile and create a distracting line against the wall or ceiling above the art.

Accordingly, what is needed is a discreet wire anchoring system. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a discreet wire anchoring system is now met by a new, useful, and nonobvious invention.

The present invention removes rail apparatuses altogether and allows for an invisible hanging system, which not only eliminates distractions to the display of art and the architecture that houses it, but also has an extremely low cost due to its relative simplicity.

The novel structure includes a proximal end cap having a proximal end, a distal end, a through hole extending between the proximal and distal ends, and a width extending outward in a radial direction with respect to the through hole. The device further includes a panel washer extending outward in a longitudinal direction from the distal end of the proximal end cap to create a distal end and a proximal end of the panel washer, wherein the panel washer has a through hole extending between the proximal and distal ends of the panel washer. The proximal end cap has a width greater than a width of the panel washer.

Attached to the distal end of the panel washer is a first set of pivoting arms, wherein each arm in the first set of pivoting arms has a distal end, a proximal end, an inward facing surface, and an outward facing surface. The first set of pivoting arms is convertible between a streamlined orientation and an anchoring orientation.

A wire is received by the through hole in the proximal end cap and the through hole in the panel washer to attach to a wire anchor capable of securing an end of the wire. The wire anchor has a size large enough to prevent passage through the panel washer's through hole. The arms are convertible between the streamlined orientation and the anchoring orientation by adjusting the amount of tension in the wire and in turn the force exerted on the wire anchor, thereby altering the orientation of the pivoting arms.

A certain embodiment includes a distal end cap having a through hole capable of receiving the wire, wherein the wire passes through the through hole of the distal end cap before being secured by the wire anchor. The distal end cap has a width extending outward in a radial direction with respect to the through hole, the width being less than a portion of the proximal end cap.

A certain embodiment includes a second set of pivoting arms, wherein each arm in the second set of pivoting arms has a proximal end and a distal end. The distal end of each arm in the first set of pivoting arms is pivotally connected to the proximal end of one of the arms in the second set of pivoting arms. The streamlined orientation includes the arms in the first set of pivoting arms being longitudinally aligned with the arms in the second set of pivoting arms and the anchoring orientation includes the arms in the first set of pivoting arms and the arms in the second set of pivoting arms outspread in a radial direction with respect to a central longitudinal axis of the panel washer such that the arms extend beyond the width of the panel washer.

In a certain embodiment, the wire is a monofilament and the proximal end cap is transparent. In a certain embodiment, the panel washer extends a length roughly equal to the thickness of a panel that the hanging system is to be inserted.

In a certain embodiment, the wire anchor further includes locking arms and the panel washer further includes a socket. The socket is adapted to receive the locking arms and temporarily secure the locking arms in the socket. A release mechanism is adapted to pass through the through hole of the proximal end cap and into the through hole of the panel washer to contact the locking arms, thereby flexing the locking arms towards the central longitudinal axis of the panel washer out of contact with the socket while also forcing the locking arms out of the socket to release the wire anchor.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention is an anchoring system designed to be inserted into a ceiling or wall panel (hereinafter "panel"). The anchoring system provides a generally invisible means for securing an object off the ground for display. The system includes proximal end cap 100, panel washer 102, set of pivoting arms 104, distal end cap 106 or wire anchor 108, and wire 110.

Proximal end cap 100 preferably has proximal end 100a, distal end 100b, and a diameter or width greater than a hole in which the device will be inserted. Proximal end cap 100 is designed to remain on interior facing surface 112a (the surface facing towards the interior of the room) of panel 112 to allow an individual to easily access proximal end cap 100 and remove the anchoring system. Proximal end cap 100 is preferably transparent or semi-transparent and may have any shape known to a person having ordinary skill in the art. Additionally, proximal end cap 100 contains a through hole (not labeled to reduce clutter) extending from proximal end 100a to distal end 100b and being of a size large enough to receive wire 110. The through hole provides a lumen through which wire 110 may pass without contacting and potentially damaging surrounding panel 112.

Panel washer 102 similarly has proximal end 102a and distal end 102b such that there exists a length between the two ends, where the length is preferably the thickness of panel 112. Proximal end 102a is attached to distal end 100b of proximal end cap 100. Distal end 100b of proximal end cap 100 is the end or surface facing towards panel 112. Distal end 102b of panel washer 102 is pivotally connected to at least one set of pivoting arms 104. The connection is preferably located at a point inside of the maximum width of panel washer 102 to allow pivoting arms 104 to easily pass through the hole in panel 112 where panel washer 102 is intended to rest. Furthermore, panel washer 102 includes a through hole (not labeled to reduce clutter) running the length of panel washer 102 and that is adapted to receive wire 110.

Figure 1:
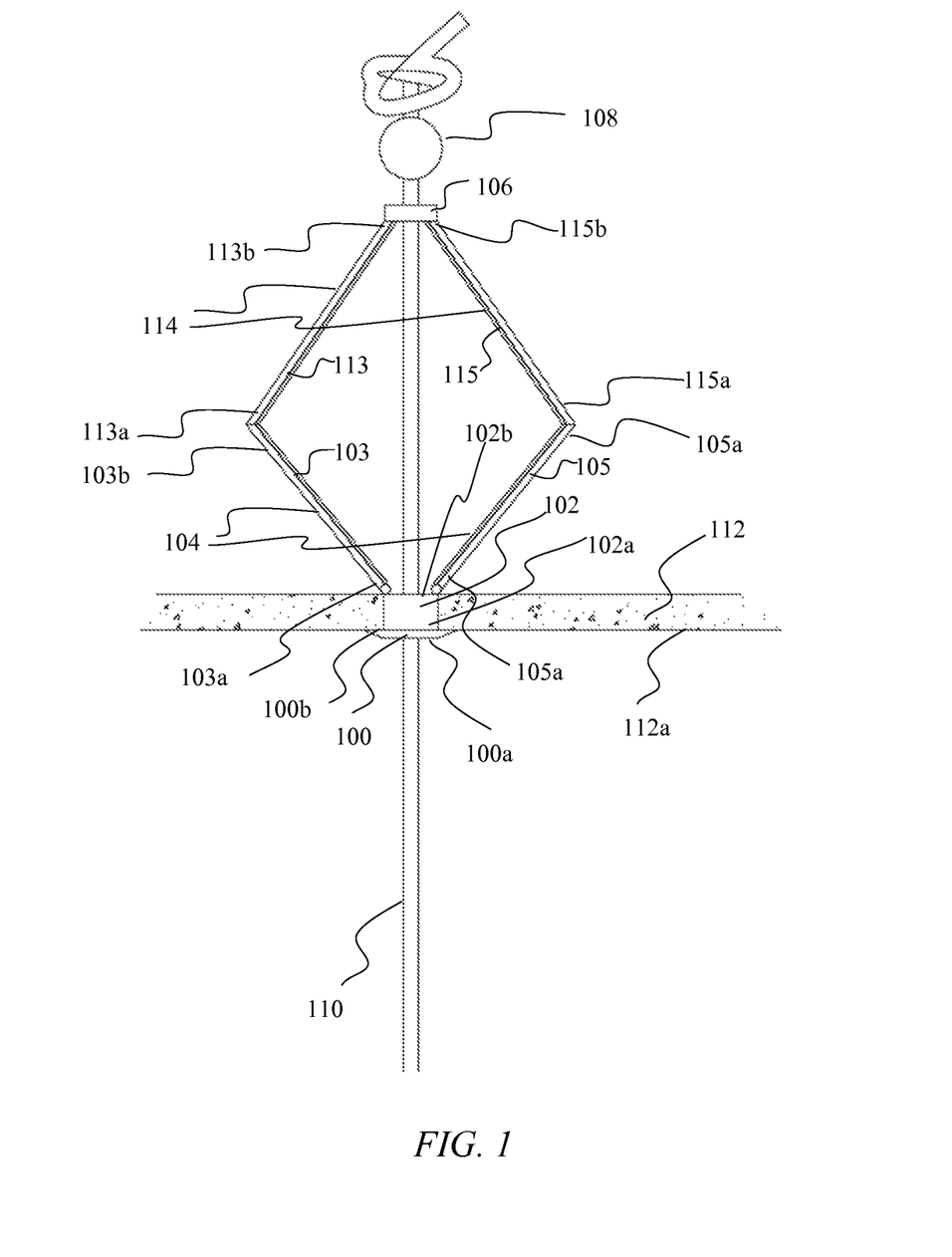
FIG. 1 is a front elevation view of a certain embodiment of the present invention in a semi-anchoring orientation and disposed in a ceiling panel.

In a certain embodiment, as shown in FIG. 1, there are two sets of pivoting arms 104, 114. However, any number of sets may be used. Each set of pivoting arms includes a first arm 103, 113 and a second arm 105, 115; however, any number of arms may be used as is known by a person having ordinary skill in the art. The arms 103, 105, 113, 115 can be broken down into proximal ends 103a, 105a, 113a, 115a and distal ends 103b, 105b, 113b, 115b, wherein the proximal end is nearest proximal end cap 100 and the distal end is further from proximal end cap 100. In this embodiment the two sets of pivoting arms 104, 114 are connected. Proximal ends 103a, 105a of first set of arms 104 are pivotally connected to distal end 102b of panel washer 102 and distal ends 103b, 105b of first set of arms 104 are pivotally connected to proximal end 113a, 115a of second set of arms 114. Distal ends 113b, 115b of second set of arms 114 are pivotally attached to distal end cap 106. The pivotal attachments of distal ends 113b, 115b of second set of arms 114 to distal end cap 106 are preferably within the maximum outer width of panel washer 102.

The two sets of pivoting arms 104, 114 are convertible between two orientations—an anchoring orientation and a streamlined orientation. When in the streamlined orientation, the two sets of arms 104, 114 are longitudinally aligned and distal end cap 106 is at its furthest distance from proximal end cap 100. The streamlined orientation allows the anchoring system to become as narrow as possible, such that the device can be easily inserted into or removed from the intended hole in panel 112. The anchoring orientation is accomplished after the device has been inserted through panel 112 and a force is exerted on distal end cap 106 forcing it towards proximal end cap 100. The first and second sets of arms 104, 114, collapse down to a more parallel orientation with respect to panel 112. As distal end cap 106 is forced towards proximal end cap 100, arms 103, 105 in first set 104 and arms 113, 115 in second set 114 pivot with respect to each other and proximal ends 113a, 115a of arms 113, 115 in second set 114 and distal ends 103b, 105b of arms 103, 105 in first set 104 extend outward away from the central longitudinal axis of panel washer 102. As ends 113a, 115a, 103b, 105b extend outward, the two sets of arms 104, 114 approach each other producing a stack-like configuration to prevent the device from exiting the hole. FIG. 1 shows the two sets of pivoting arms 104, 114 in between the anchoring orientation and the streamlined orientation.

In this particular embodiment, the device is designed so that tension in wire 110 forces distal end cap 106 towards proximal end cap 100. As shown in FIG. 1, distal end cap 106 has a through hole, which wire 110 passes. Wire 110 further passes through wire anchor 108, wherein wire anchor 108 has a size greater than the through hole in distal end cap 106. Wire 110 is knotted after passing through wire anchor 108 and wire anchor 108 prevents the end of wire 110 from passing through distal end cap 106, ultimately forcing distal end cap 106 towards proximal end cap 100 when tension is applied to wire 110. In a certain embodiment, wire 110 can be fixed directly to distal end cap 106 or directly to wire anchor 108. Additionally, wire anchor 108 may be any shape so long as it is capable of preventing wire 110 from exiting the through hole of distal end cap 106.

Distal end cap 106 has a width of equal or lesser magnitude than the width of proximal end cap 100. The width of distal end cap 106 is preferably of equal or lesser magnitude than the width of panel washer 102 to allow the device to be easily inserted into a hole in panel 112 having a width slightly larger than panel washer 102, but preferably less than the width of proximal end cap 100.

Figure 2:
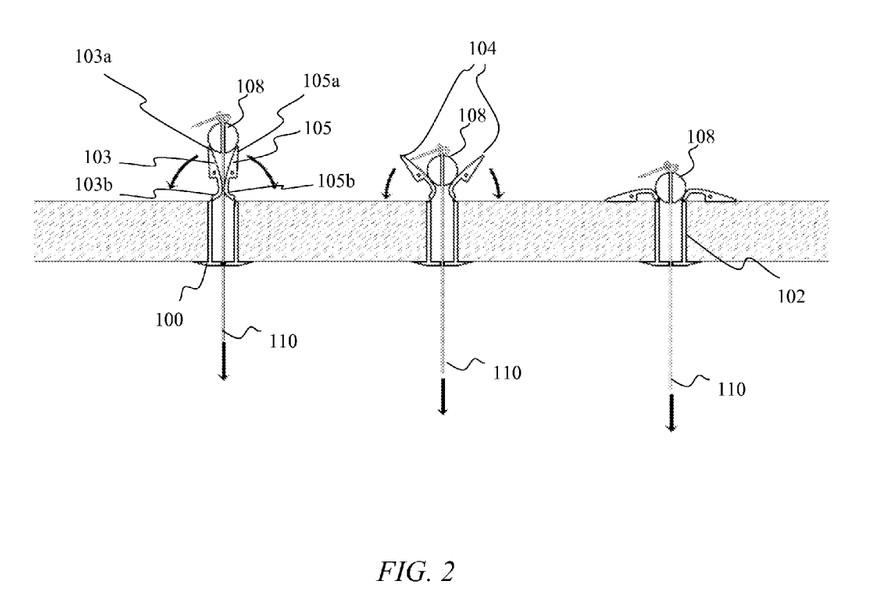
FIG. 2 is a front elevation view of a certain embodiment of the present invention showing the transition from a streamlined orientation (shown on the left) to an anchoring orientation (shown on the right).

FIG. 2 shows three systems secured in a single wall panel to illustrate the transition from a streamlined orientation on the left to an anchoring orientation shown on the right. As shown in FIG. 2, a certain embodiment lacks a distal end cap and uses only one set of pivoting arms 104. There are two arms in set 104; however, any number of arms may be used. Each arm 103, 105 has proximal end 103a, 105a, distal end 103b, 105b, an inward facing surface (the surface facing towards the central longitudinal axis of panel washer 102 when in a streamlined orientation), and an outward facing surface. Proximal ends 103a, 105a are pivotally attached to panel washer 102 and distal ends 103b, 105b are free. The inward facing surface has an arced shape so that at least some portion of the inward facing surface extends inward further than distal ends 103b, 105b and proximal ends 103a, 105a. The shape of the inward facing surface provides at least some friction on wire anchor 108 and aids in converting the system to the anchoring orientation as wire anchor 108 is pulled from distal ends 103b, 105b of the arms to the proximal ends 103a, 105a of the arms.

The arced inward facing surface also provides wire anchor 108 with a resting position at distal ends 103b, 105b when the system is in the streamlined orientation. The arced inward facing surface produces a gap between distal ends 103b, 105b of the arms when in the fully streamlined orientation, which receives at least some portion of wire anchor 108. Additionally, the peak of the arc is preferably closer to proximal ends 103a, 105a of the set of arms 104 to allow wire anchor 108 to come to a set position near distal end 102b of panel washer 102 while also keeping the arms 103, 105 in an anchoring orientation. Wire anchor 108 and the inward facing surface of each arm 103, 105 may be any shape known to a person having ordinary skill in the art such that the two are capable of temporarily mating near distal end 102b of panel washer 102 so that arms 103, 105 will remain in the anchoring orientation while there exists a tension force on wire 110.

Wire anchor 108 is preferably of a size and shape that prevents wire anchor 108 from passing through panel washer 102, but also allows wire anchor 108 to at least partially rest in the gap formed between distal ends 103b, 105b of arms 103, 105. The size and shape must also allow wire anchor 108 to advance from distal ends 103b, 105b towards proximal ends 103a, 105a when a tension force is exerted on wire 110. Furthermore, the size and shape of wire anchor 108 includes a narrower cross-section than proximal end cap 100, such that wire anchor 108 can pass through a hole in panel 112 that proximal end cap 100 cannot.

Figure 3:
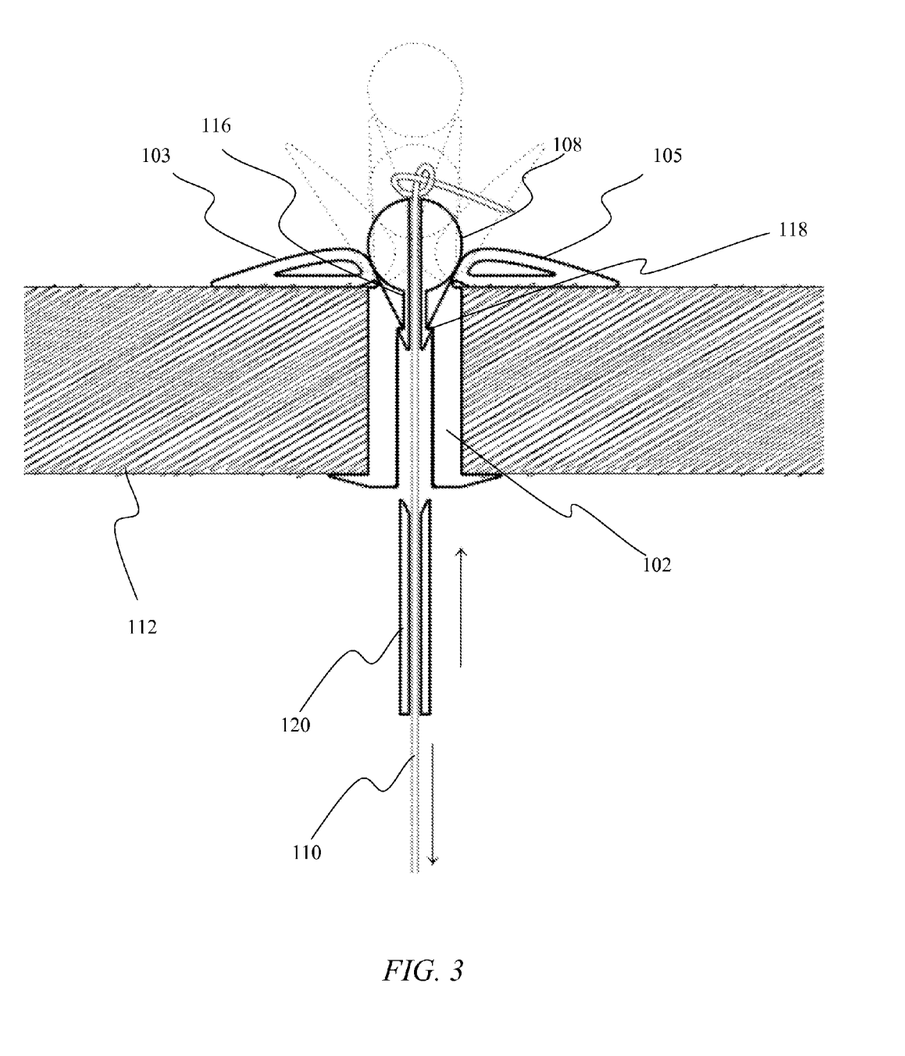
FIG. 3 is a front elevation view of a certain embodiment of the present invention having a snap buckle fastener and shown in an anchoring orientation.
Figure 4:
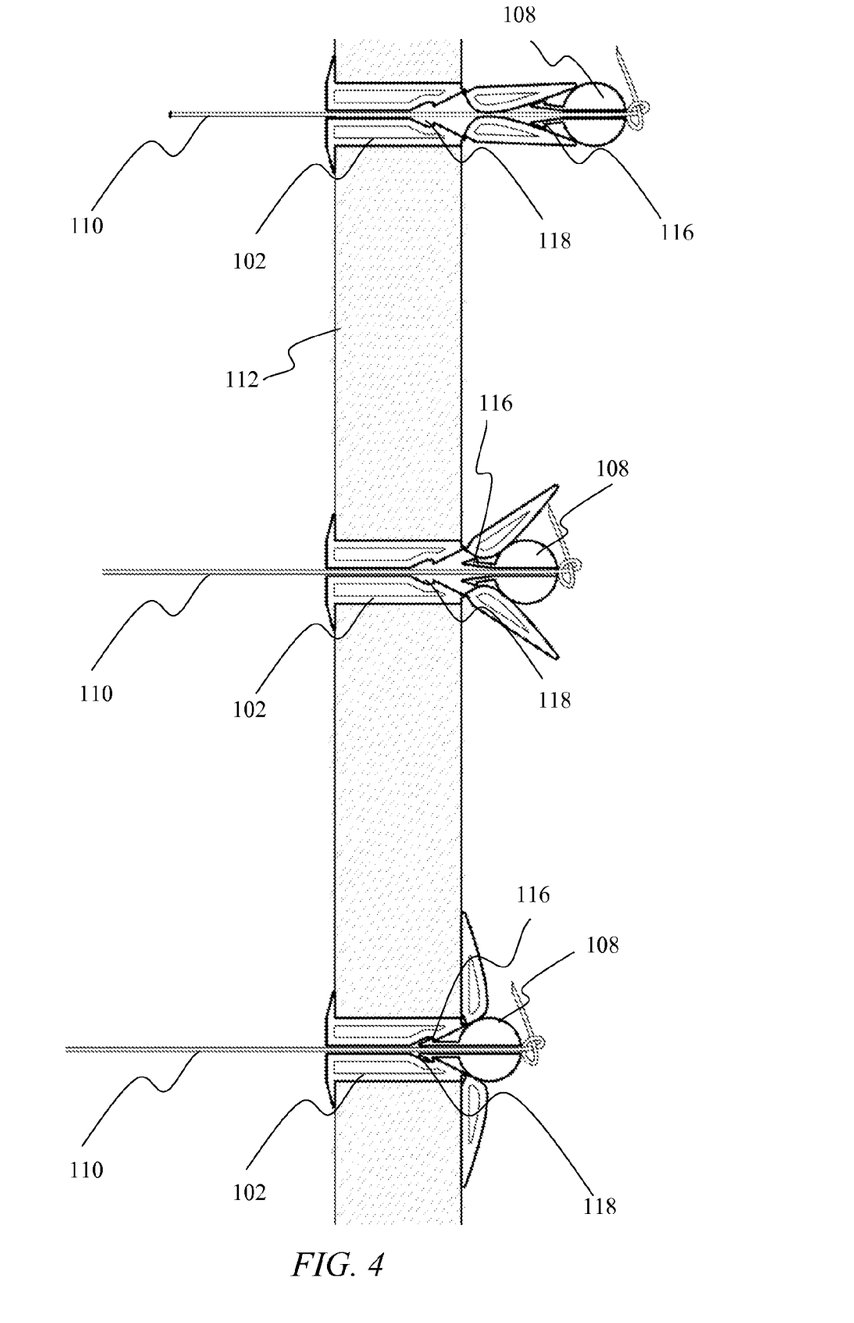
FIG. 4 is a side elevation view illustrating the transition between the streamline orientation (shown on top) and the anchoring orientation (shown on bottom) of the embodiment shown in FIG. 3 disposed in a wall panel.

In an alternative embodiment, as shown in FIGS. 3 and 4, wire anchor 108 may include a locking mechanism adapted to temporarily mate and lock with panel washer 102. In this embodiment, the temporary locking mechanism is a snap buckle fastener. Wire anchor 108 has two or more semi-flexible locking arms 116 of a size and shape capable of being received by panel washer 102. Panel washer 102 includes socket 118 near distal end 102b of panel washer 102. Socket 118 is adapted to receive locking arms 116 when wire anchor 108 is near distal end 102b of panel washer 102 and locking arms 116 latch to socket 118. In such an embodiment, locking arms 116 are released from socket 118 by inserting releasing mechanism 120 into proximal end 102a of panel washer 102. Releasing mechanism 120 is designed to exert a force on locking arms 116 to flex locking arms 116 towards the central longitudinal axis of panel washer 102 and at the same time force locking arms 116 out of panel washer 102. As locking arms 116 are flexed towards the central longitudinal axis, locking arms 116 lose contact with the socket 118 or at least the portion of socket 118 that was securing locking arms 116 in socket 118. Additionally, locking arms 116 do not prevent wire 110 from passing through or connecting to wire anchor 108.

Figure 5:
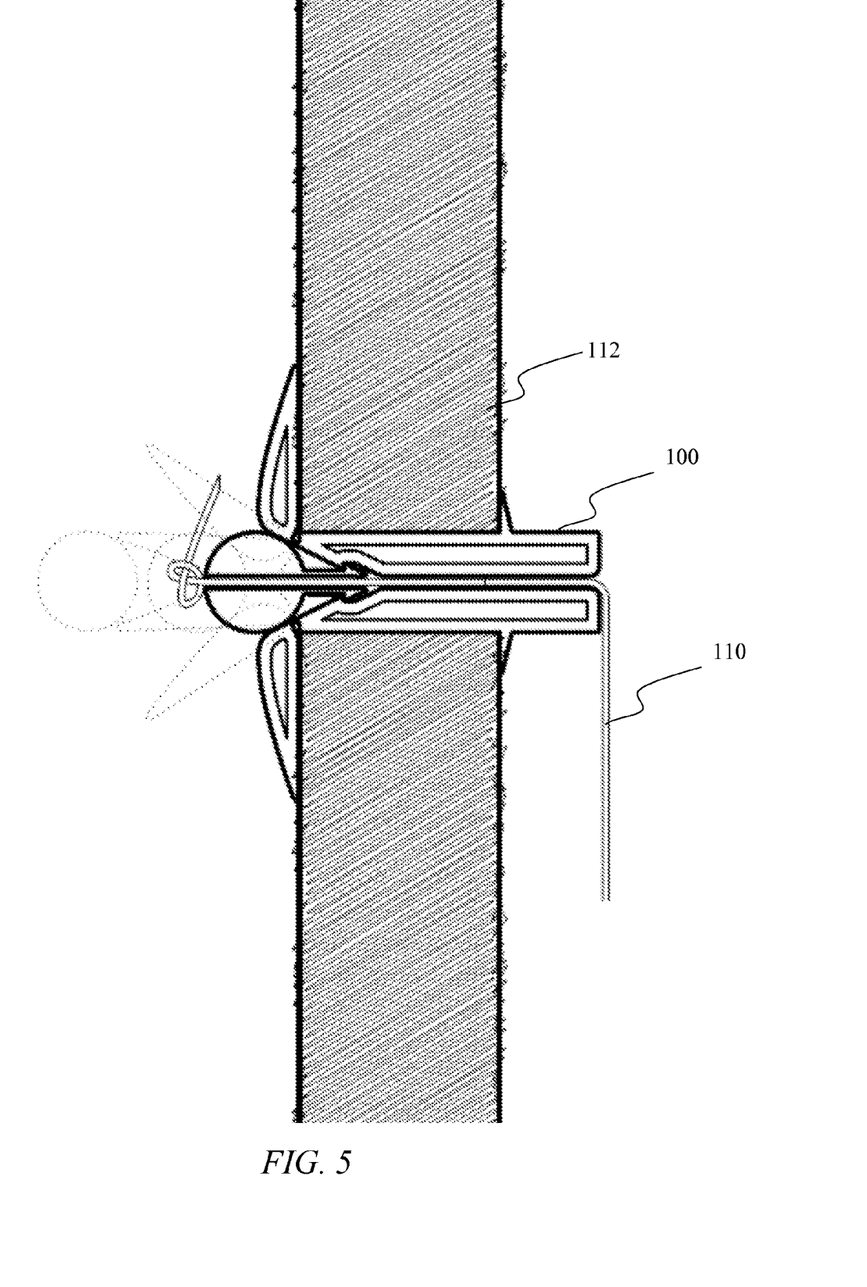
FIG. 5 is a side elevation view of a certain embodiment of the present invention, having a snap buckle fastener and an extended proximal end cap, disposed in a wall panel.

A certain embodiment, as shown in FIG. 5, includes proximal end cap 100 having an extended designed to be used when securing the anchoring system to a sidewall. The extended variation of proximal end cap 100 provides a distance between panel 112 and wire 110.

In a certain embodiment, the wire is made of a transparent material. Moreover, in a certain embodiment, the pivoting connections may be accomplished by any techniques known to a person having ordinary skill in the art. Additionally, the anchoring system may utilize any materials known to a person having ordinary skill in the art.

Glossary of Claim Terms

Anchoring Orientation: is an orientation where some portion of the system has a greater with than the width of the proximal end cap.

Streamlined Orientation: is an orientation where no other feature of the device extends further from the central longitudinal axis of the panel washer than the proximal end cap.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A hanging system comprising:
    a proximal end cap having a proximal end, a distal end, a through hole extending between the proximal and distal ends, and a width extending outward in a radial direction with respect to the through hole;
    a panel washer affixed to and extending outward in a longitudinal direction from the distal end of the proximal end cap to create a distal end and a proximal end of the panel washer, wherein the panel washer has a through hole extending between the proximal and distal ends of the panel washer;
    a first set of pivoting arms, wherein each arm in the first set of pivoting arms has a distal end, a proximal end, an inward facing surface and an outward facing surface, the proximal end of each is pivotally connected to the distal end of the panel washer, and the first set of pivoting arms are convertible between a streamlined orientation and an anchoring orientation;
    a wire that is received by the through hole in the proximal end cap and the through hole in the panel washer;
    a wire anchor capable of securing an end of the wire, the wire anchor being of a size large enough to prevent passage through the panel washer's through hole;

a second set of pivoting arms, wherein each arm in the second set of pivoting arms has a proximal end and a distal end;

the distal end of each arm in the first set of pivoting arms pivotally connects to the proximal end of one of the arms in the second set of pivoting arms;

the streamlined orientation includes the arms in the first set of pivoting arms being longitudinally aligned with the arms in the second set of pivoting arms; and the anchoring orientation includes the arms in the first set of pivoting arms and the arms in the second set of pivoting arms outspread in a radial direction with respect to a central longitudinal axis of the panel washer such that the arms extend beyond the width of the panel washer.

2. The hanging system of claim 1, wherein a portion of the proximal end cap has a width greater than a width of the panel washer.

3. The hanging system of claim 1, further comprising a distal end cap having a through hole capable of receiving the wire.

4. The hanging system of claim 3, wherein the wire passes through the through hole of the distal end cap before being secured by the wire anchor.

5. The hanging system of claim 3, wherein the distal end cap has a width extending outward in a radial direction with respect to the through hole, the width being less than a portion of the proximal end cap.

6. The hanging system of claim 1, wherein the wire is a monofilament.

7. The hanging system of claim 1, wherein the proximal end cap is transparent.

8. The hanging system of claim 1, wherein the panel washer extends a length roughly equal to the thickness of a panel that the hanging system is to be inserted.

9. A hanging system comprising:
a proximal end cap having a proximal end, a distal end, a through hole extending between the proximal and distal ends, and a width extending outward in a radial direction with respect to the through hole;
a panel washer affixed to and extending outward from the distal end of the proximal end cap to create a distal end and a proximal end of the panel washer, wherein the panel washer has a through hole extending between the proximal and distal ends of the panel washer;
a first set of pivoting arms, wherein each arm in the first set of pivoting arms has a distal end, a proximal end, an inward facing surface and an outward facing surface, the proximal end of each is pivotally connected to the distal end of the panel washer, and the first set of pivoting arms are convertible between a streamlined orientation and an anchoring orientation;
a wire that is received by the through hole in the proximal end cap and received by the through hole in the panel washer;
a wire anchor capable of securing an end of the wire, the wire anchor being of a size large enough to prevent passage through the panel washer's through hole;
a portion of the proximal end cap has a width greater than a width of the panel washer;
the arms are convertible between the streamlined orientation and the anchoring orientation by adjusting the amount of tension in the wire and in turn the force exerted on the wire anchor thereby altering the orientation of the pivoting arms;
a second set of pivoting arms, wherein each arm in the second set of pivoting arms has a proximal end and a distal end;
the distal end of each arm in the first set of pivoting arms pivotally connects to the proximal end of one of the arms in the second set of pivoting arms;
the streamlined orientation includes the arms in the first set of pivoting arms being longitudinally aligned with the arms in the second set of pivoting arms; and
the anchoring orientation includes the arms in the first set of pivoting arms and the arms in the second set of pivoting arms outspread in a radial direction with respect to a central longitudinal axis of the panel washer such that the arms extend beyond the width of the panel washer.

10. The hanging system of claim 9, further comprising a distal end cap having a through hole capable of receiving the wire.

11. The hanging system of claim 10, wherein the wire passes through the through hole of the distal end cap before being secured by the wire anchor.

12. The hanging system of claim 10, wherein the distal end cap has a width extending outward in a radial direction with respect to the through hole, the width being less than the portion of the proximal end cap.

13. The hanging system of claim 9, wherein the wire is a monofilament.

14. The hanging system of claim 9, wherein the proximal end cap is transparent.

15. The hanging system of claim 9, wherein the panel washer extends a length roughly equal to the thickness of a panel that the hanging system is to be inserted.

16. A hanging system comprising:
a proximal end cap having a proximal end, a distal end, a through hole extending between the proximal and distal ends, and a width extending outward in a radial direction with respect to the through hole;
a panel washer extending outward in a longitudinal direction from the distal end of the proximal end cap to create a distal end and a proximal end of the panel washer, wherein the panel washer has a through hole extending between the proximal and distal ends of the panel washer;
a first set of pivoting arms, wherein each arm in the first set of pivoting arms has a distal end, a proximal end, an inward facing surface and an outward facing surface, the proximal end of each is pivotally connected to the distal end of the panel washer, and the first set of pivoting arms are convertible between a streamlined orientation and an anchoring orientation;
a wire that is received by the through hole in the proximal end cap and the through hole in the panel washer;
a wire anchor capable of securing an end of the wire, the wire anchor being of a size large enough to prevent passage through the panel washer's through hole; and
the wire anchor further including locking arms and the panel washer further including a socket, the socket adapted to receive the locking arms and temporarily secure the locking arms in the socket.

* * * * *